March 23, 1965     R. G. FERRIS     3,174,757
FLAIL TYPE MATERIAL SPREADER WITH PIVOTED SHIELD
Filed May 21, 1963     3 Sheets-Sheet 1
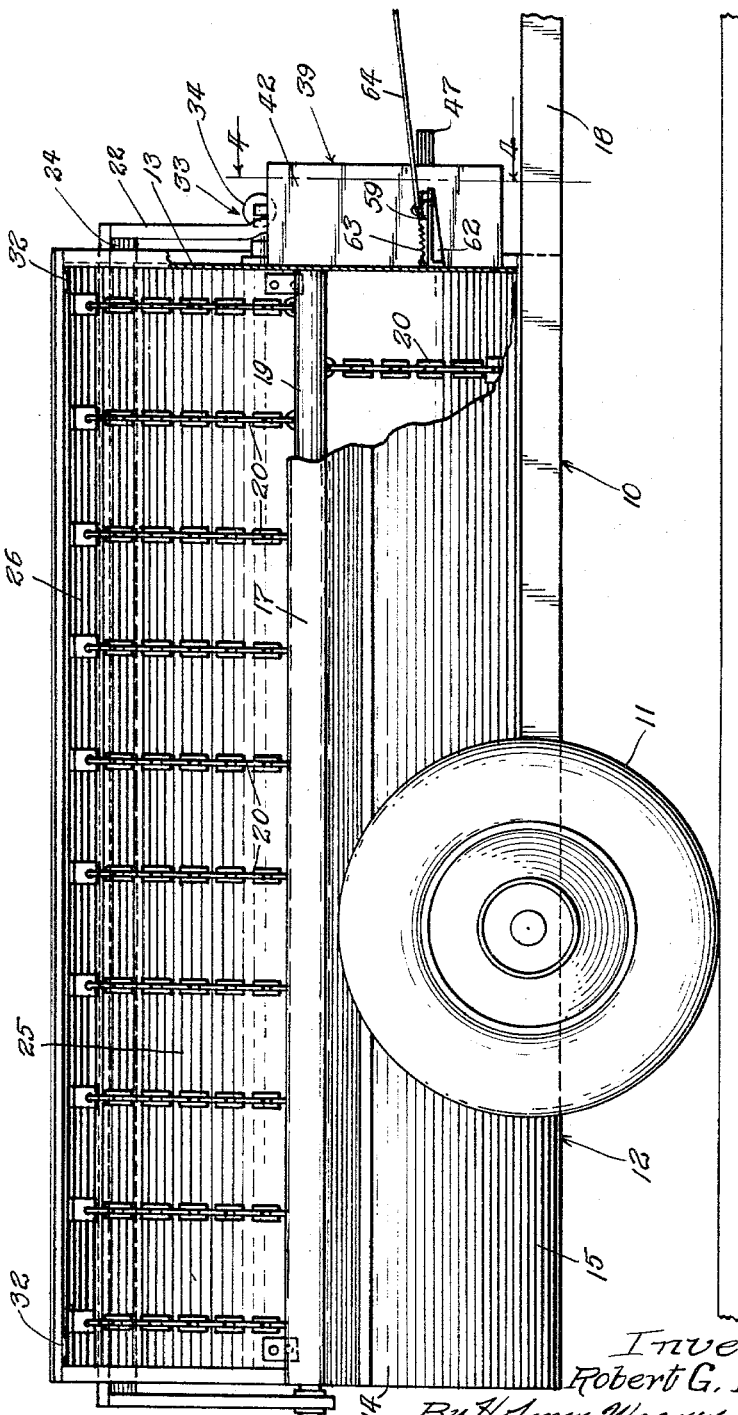
Inventor:
Robert G. Ferris,
By Hofgren, Wegner, Allen,
Stellman, McCord, Attys March 23, 1965 R. G. FERRIS 3,174,757
FLAIL TYPE MATERIAL SPREADER WITH PIVOTED SHIELD
Filed May 21, 1963 3 Sheets-Sheet 2
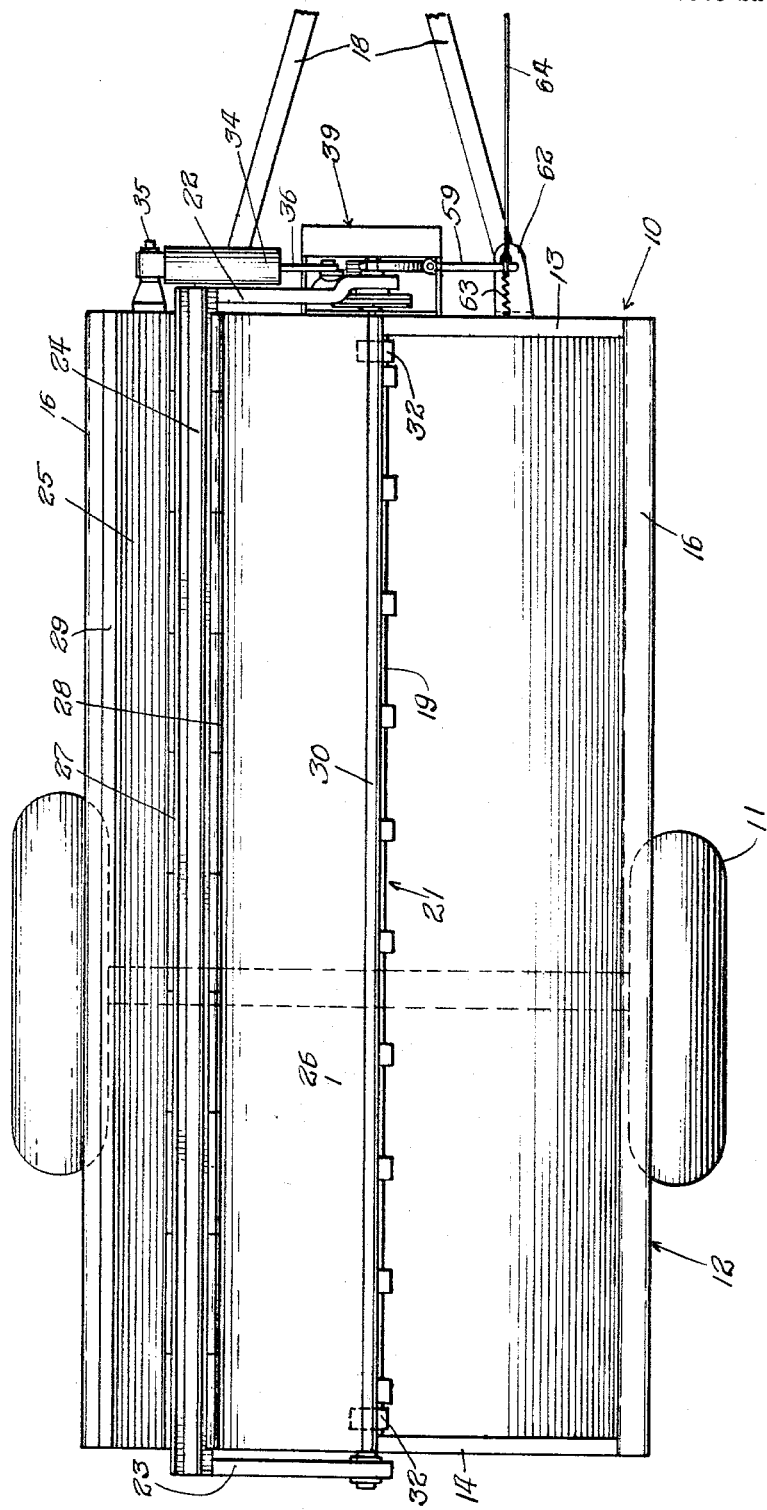

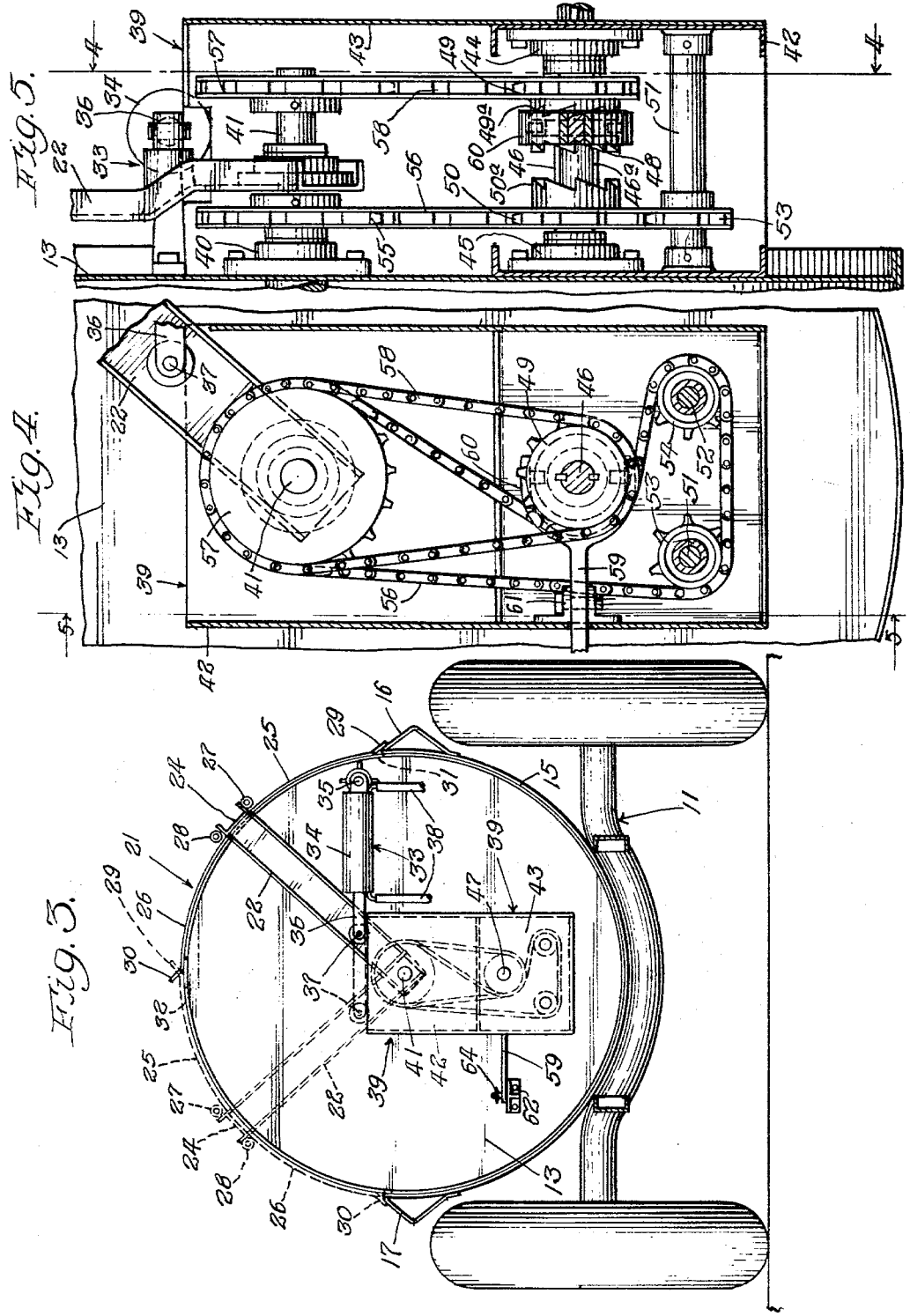

United States Patent Office 3,174,757
Patented Mar. 23, 1965

3,174,757
FLAIL TYPE MATERIAL SPREADER WITH PIVOTED SHIELD
Robert G. Ferris, Harvard, Ill., assignor to Starline, Inc., a corporation of Illinois
Filed May 21, 1963, Ser. No. 281,909
9 Claims. (Cl. 275—3)

This invention relates to a flail type material spreader, and in particular it relates to an improvement upon flail type material spreaders of the kind which discharge material laterally with respect to the line of travel of the spreader.

Flail type spreaders of the above defined sort have been made commercially only for loading and discharge over the right-hand side wall of the spreader container. The reason is that most tractor power take-offs are limited to clockwise rotation (as viewed from the rear of the tractor), so that a direct drive of the unloader shaft from the power take-off results in clockwise rotation of the unloader shaft and discharge of material over the right side wall of the container. Since the spreader must have a shield overlying approximately the upper quadrant opposite the side over which material is discharged, the conventional side unloading flail type spreader must be loaded from the right-hand side also.

There are various circumstances which make it desirable to provide a spreader which may be filled from either side and unloaded over either side. Thus, for example, surveys indicate that between 40 and 50 percent of farm barnyards have such an arrangement of structures around the barn that a material spreader can approach a barn gutter cleaner or other manure handling a loading device only with the device to the left of the spreader container. Accordingly, operators of such farms cannot use any commercially available side unloading spreader.

Furthermore, there are various circumstances in the field which may make it desirable for a farmer to be able to discharge material either over the right side or over the left side of the spreader. For example, a field which is on a side hill location may require that the manure be spread either downhill or uphill from the spreader in order to have a proper distribution of manure. Likewise, in some circumstances it may be desirable for the operator to discharge material in opposite directions on successive trips across the field. Problems of wind direction, proximity to fence lines, and other factors often make it highly desirable for the farmer to be able to discharge material selectively over either of the two side walls of the container.

In accordance with the present invention, a side unloading flail type spreader has a container which is substantially semi-cylindrical, and a longitudinal hood which encloses an upper quadrant above the container is mounted for swinging movement on the container end walls so that the hood may be selectively positioned either above the left-hand quadrant for right-hand discharge of material from the spreader, or above the right-hand quadrant for left-hand discharge of material. At the same time, a simple reversing drive is provided so that the unloader shaft may be rotated in the correct direction for discharge of material through the open quadrant—i.e. over the open side of the spreader. Both the shifting of the hood and the reversal of the drive may be controlled by an operator on a tractor behind which the spreader is being towed.

The ease of accomplishing reversal of the hood and reversal of the drive makes it entirely practical for a farmer to load the spreader from the more convenient side and unload it toward the more convenient side, whether these sides are the same or different.

The invention is illustrated in a preferred embodiment in the accompanying drawings in which:

FIG. 1 is a side elevational view of a spreader in accordance with the invention, with a part of the side wall broken away;

FIG. 2 is a top plan view of the spreader of FIG. 1;

FIG. 3 is a front elevational view of the spreader of the present invention with the adjustable hood in solid lines in one position and in broken lines in another position;

FIG. 4 is a sectional view taken substantially as illustrated along the line 4—4 of FIG. 5, illustrating the reversing drive for the spreader; and FIG. 5 is a sectional view taken substantially as illustrated along the line 5—5 of FIG. 4.

Referring to the drawings in greater detail, and referring first to FIGS. 1 and 2, a spreader, indicated generally at 10, has a wheeled frame 11 and a container, indicated generally at 12, which has front and rear end walls 13 and 14, respectively, and an arcuate bottom-side wall member 15 (FIG. 3) which cooperates with the end walls to provide a semi-cylindrical container. Longitudinal triangular braces 16 and 17 extend from end-to-end of the container along its two upper margins. A hitch tongue 18, which is integral with the wheeled frame 11, extends forwardly of the container so the spreader may be connected to the draw bar of a tractor (not shown).

Unloading and spreading of material from the container is caused by rotation of an unloader shaft 19 which extends longitudinally of the container on the axis of the cylinder, and flexible flails 20 are secured to the unloader shaft so that rotation of the shaft causes the flails to fling material from the container over the container side wall.

Referring now especially to FIG. 3, a shiftable hood, indicated generally at 21, is carried upon supporting arms 22 and 23 that are pivotally mounted, respectively, outside the front and rear end walls 13 and 14 of the container and on the axis of the cylinder. A structural channel member 24 extends longitudinally of the container and has its ends secured to the arms 22 and 23, and two identical arcuate sheet metal hood elements 25 and 26 are pivotally mounted along opposite sides of the channel 24 by means of hinges 27 and 28, respectively. As best seen in FIG. 3, the hood element 25 has an outwardly inclined flange at its free edge and the hood element 26 has a similar flange 30 at its free edge; and fingers 31 and 32 which diverge, respectively, from the inclined skirts 29 and 30 cooperate with said skirts to afford forks which straddle one or the other of the triangular stiffening members 16 and 17 which form the upper edges of the container 12. The full line position of FIG. 3 illustrates the hood 21 supported upon the stiffening member 16 by fork structure 29–31 and by swinging the hood to the opposite quadrant of the container it may be supported upon the stiffening member 17 in the broken line portion of FIG. 3 by means of fork structure 30–32. In either position of the hood, one of the two hood elements—i.e. the element remote from the edge of the semi-cylindrical container—may be swung back upon its hinges to enlarge the available opening for loading the container.

For convenience of operation the movable hood 21 is shifted between its two positions by means of a hydraulic cylinder and piston unit, indicated generally at 33, that includes a cylinder 34 pivotally mounted at 35 on the front wall 13 of the container, and a piston rod 36 which is pivotally connected at 37 to the hood supporting arm 22. Hydraulic conduits 38 connect the cylinder 34 with the conventional hydraulic pressure source on the tractor, and a suitable control on the tractor permits an operator seated on the tractor seat to extend or retract the piston rod 36 so as to swing the hood 21 between the broken line position of FIG. 3 and the full line position of FIG. 3. Thus, the hydraulic cylinder and piston unit provides movably mounted actuating means which is pivotally connected to a fixed part of the spreader—i.e. the front wall—and to the mounting means.

Referring now particularly to FIGS. 4 and 5, a reversing drive for the unloader shaft 19 is indicated generally at 39. As best seen in FIG. 5, the front of unloader shaft 19 is journalled in a bearing member 40 on the front wall 13 of the container, and a forward end portion 41 of the shaft projects into a box-like frame 42 which houses the drive for the unloader shaft. A front wall 43 of the box frame supports a journal member 44, and supported in said journal member and in an aligned journal 45 on the container front wall 13 is an input shaft 46 having a projecting front end 47 by means of which it may be driven from a tractor power take-off. The central portion of input shaft 46 is splined as seen at 46a, and a toothed clutch member 48 is mounted for sliding movement on the shaft 46 in engagement with the spline 46a.

A direct, or clockwise drive sprocket 49 is journalled toward the front of the shaft 46, and a reverse drive sprocket 50 is journalled toward the rear of said shaft. Said sprockets are provided, respectively, with toothed clutch faces 49a and 50a with which the sliding clutch member 48 may be selectively engaged so as to drive either the sprocket 49 or the sprocket 50.

As best seen in FIG. 4, a pair of fixed shafts 51 and 52 are secured in spaced relationship to one another in the front box frame wall 43 and the front container wall 13; and idler sprockets 53 and 54 are journalled, respectively, upon the shafts 51 and 52. An input sprocket 55 is mounted on the unloader shaft 19 in the same plane with the rear sprocket 50 and idler sprockets 53 and 54, and a roller chain 56 is trained around the input sprocket 55 and around the idler sprockets 53 and 54 and back wrapped around the sprocket 50 so that the unloader shaft 19 may be driven in a direction opposite to that of the input shaft 46.

For direct drive of the unloader shaft 19 a sprocket 57 at the extreme forward end of the unloader shaft extension 41 carries a drive chain 58 which is also trained around the direct drive sprocket 49 on the input shaft 46.

Control of the sliding clutch 48 is by means of a clutch arm 59 which has a forked end 60 engaged in a cooperating groove in the clutch member. The control arm 59 is pivoted at 61 and has its outer end slidably carried on a bracket 62; and a tension spring 63 draws the arm 59 rearwardly so as to normally engage the toothed clutch 48 with the direct drive sprocket 49. A control cord 64 leads from the free end of the arm 59 to a position where it is accessible to an operator on the tractor so that the operator may selectively reverse the direction of rotation of the unloader shaft 19 by movement of the clutch when he reverses the position of the movable hood 21.

The foregoing detailed description is given for clearness of understanding only and no unnecessary limitations are to be understood therefrom, as some modifications will be obvious to those skilled in the art.

I claim:

1. In a material spreader, in combination: a frame; a generally semi-cylindrical container on said frame having end walls and continuous arcuate bottom and side walls, said side walls having substantially coplanar upper margins; a longitudinal unloader shaft on the axis of the container; a plurality of flexible flails on said unloader shaft; means for driving the shaft to cause said flails to discharge material over a side of the container; arcuate hood means having opposite longitudinal edges one of which is positioned at the upper margin of one of said side walls to provide an upward extension of said one of said side walls around the adjacent upper quadrant of the cylinder; movable mounting means supporting said hood means for arcuate movement of said edges about the axis of the container to selectively position the latter in one upper quadrant or the other and having an edge positioned at one side wall or the other; movably mounted actuating means pivotally connected to a fixed part of the spreader and to the mounting means for pivoting the latter about said axis; and means for reversing the driving means to discharge material over the side of the container remote from the hood means.

2. In a material spreader, in combination: a frame; a generally semi-cylindrical container on said frame having end walls and arcuate side and bottom walls; a longitudinal unloader shaft on the axis of the container; a plurality of flexible flails on said unloader shaft; means for driving the shaft to cause said flails to discharge material over a side of the container; a pair of arms pivoted about the axis of the container; a structural member connecting the free ends of said arms; two arcuate, longitudinal sheet metal members secured to opposite sides of the structural member and cooperating therewith to provide an arcuate hood which occupies approximately an upper quadrant of the cylinder to form an extension of the cylindrical container side wall; movable operating means for swinging said arms about the container axis to position said hood in one upper quadrant or the other; control means to control the movement of said operating means from a remote position forward of the container; and remotely controlled means for reversing the driving means to discharge material over the side of the container remote from the hood.

3. The combination of claim 2 which includes hinges mounting each of the sheet metal members on the structural member so that in either position of the hood means the upper of the two sheet metal members may be pivoted outwardly to facilitate loading the container.

4. The combination of claim 3 which includes rigid support fingers extending angularly with respect to the free edge of each of the sheet metal members and cooperating with the latter to provide forks that straddle the upper margin of a container side wall.

5. The combination of claim 2 in which the movable operating means includes a transversely extending cylinder and piston unit one end of which is pivotally connected to an end wall of the container and the other end of which is pivotally connected intermediate the ends of one of said arms, whereby extension and retraction of the piston is effective to move the hood means between the two upper quadrants of the cylinder.

6. In a material spreader, in combination: a frame; an upwardly open generally semi-cylindrical container on said frame having end walls and arcuate side and bottom walls; a longitudinal unloader shaft on the axis of the container; a plurality of flexible flails on said unloader shaft; means for driving the shaft to cause said flails to discharge material over a side of the container; a pair of arms pivoted about the axis of the container outside the end walls; movably mounted actuating means pivotally connected to a fixed part of the spreader and to one of said arms to swing said arms about the axis of the container; arcuate hood means having substantially parallel longitudinal edges and occupying an arc of about 90°, said hood means being secured to the free ends of the arms at its longitudinal median plane for edgewise movement about the axis of the container; means confining movement of the hood means between limit positions in each of which it forms an extension of a container side wall about an upper quadrant; and means for reversing the driving means to discharge material over the side of the container remote from the hood.

7. The combination of claim 6 in which the actuating means comprises fluid cylinder and piston means pivotally connected to an end wall of the container and to one of said arms, said cylinder and piston means having a pair of fluid lines connected to the cylinder at opposite sides of the piston means.

8. In a material spreader, in combination: a frame; a generally semi-cylindrical container on said frame having end walls and continuous arcuate bottom and side walls, said side wall having substantially coplanar upper margins; a longitudinal unloader shaft on the axis of the container; a plurality of flexible flails on said unloader shaft; means for driving the shaft to cause said flails to discharge material over a side of the container, said driving means including an input shaft, first sprocket and chain means for drivingly connecting the input shaft to the unloader shaft to rotate the latter clockwise, and second sprocket and chain means for drivingly connecting the input shaft to the unloader shaft to rotate the latter counterclockwise; arcuate hood means having opposite longitudinal edges one of which is positioned at the upper margin of one of said side walls to provide an upward extension of said one of said side walls around the adjacent upper quadrant of the cylinder; movable mounting means supporting said hood means for arcuate movement of said edges about the axis of the container to selectively position the latter in one upper quadrant or the other and having an edge positioned at one side wall or the other; and means for reversing the driving means to discharge material over the side of the container remote from the hood means, said means for reversing the driving means comprising a clutch splined to the input shaft and slidable therealong, means on said first and second sprocket and chain means selectively engageable by said clutch, and remotely controlled means for sliding said clutch along the input shaft.

9. In a material spreader, in combination: a frame; an upwardly open generally semi-cylindrical container on said frame having end walls and arcuate side and bottom walls; a longitudinal unloader shaft on the axis of the container; a plurality of flexible flails on said unloader shaft; means for driving the shaft to cause said flails to discharge material over a side of the container; a pair of arms pivoted about the axis of the container outside the end walls; arcuate hood means having substantially parallel longitudinal edges and occupying an arc of about 90°, said hood means being secured to the free ends of the arms at its longitudinal median plane for arcuate movement of said edges about the axis of the container, said hood means consisting of two elements, and means pivoting both said elements along their adjacent longitudinal margins so that each element may be swung outwardly to facilitate loading the container; means confining movement of the hood means between limit positions in each of which it forms an extension of a container side wall about an upper quadrant; and means for reversing the driving means to discharge material over the side of the container remote from the hood.

References Cited by the Examiner
UNITED STATES PATENTS

| | | | |
|---|---|---|---|
| 1,435,766 | 11/22 | Varland | 275—3 |
| 1,689,550 | 10/28 | Dick et al. | 172—112 X |
| 2,312,164 | 2/43 | Holzbock | 172—112 |
| 2,900,193 | 8/59 | Harriott | 275—3 |
| 3,004,765 | 10/61 | Wilkes | 275—3 |
| 3,011,793 | 12/61 | McElhinney et al. | 275—1 |

ABRAHAM G. STONE, *Primary Examiner.*

WILLIAM A. SMITH, III, *Examiner.*